(12) United States Patent
Duggleby

(10) Patent No.: US 11,970,995 B2
(45) Date of Patent: Apr. 30, 2024

(54) OBLIQUE DETONATION ROCKET ENGINE

(71) Applicant: Venus Aerospace Corp., Houston, TX (US)

(72) Inventor: Andrew Thomas Duggleby, Friendswood, TX (US)

(73) Assignee: Venus Aerospace Corp., Houston, TX (US)

(*) Notice: Subject to any disclaimer, the term of this patent is extended or adjusted under 35 U.S.C. 154(b) by 0 days.

(21) Appl. No.: 17/828,868

(22) Filed: May 31, 2022

(65) Prior Publication Data

US 2023/0383711 A1 Nov. 30, 2023

(51) Int. Cl.
*F02K 9/48* (2006.01)
*F02K 9/42* (2006.01)

(52) U.S. Cl.
CPC . *F02K 9/48* (2013.01); *F02K 9/42* (2013.01)

(58) Field of Classification Search
CPC ..... F02K 9/48; F02K 9/42; F02K 9/52; F02K 7/16; F02K 7/18; F02K 7/12; F02K 7/14; F02C 5/00
See application file for complete search history.

(56) References Cited

U.S. PATENT DOCUMENTS

| | | | | |
|---|---|---|---|---|
| 3,777,488 A * | 12/1973 | Gross | ........................ | F02K 7/16 60/768 |
| 7,690,192 B2 * | 4/2010 | Pederson | .................. | F02K 9/52 60/257 |
| 10,627,111 B2 | 4/2020 | Holley et al. | | |
| 2009/0235636 A1 * | 9/2009 | Oehrlein | ................... | F02K 9/64 60/200.1 |
| 2011/0167793 A1 * | 7/2011 | Kwon | ....................... | F02K 9/72 60/251 |
| 2014/0196460 A1 * | 7/2014 | Falempin | .................. | F02K 7/10 60/767 |
| 2014/0325958 A1 * | 11/2014 | Conrardy | .................. | F02K 7/18 60/246 |
| 2017/0146244 A1 | 5/2017 | Kurosaka et al. | | |
| 2018/0119644 A1 * | 5/2018 | Gabaldo | ................... | F02K 7/14 |
| 2018/0274788 A1 | 9/2018 | Greene et al. | | |

OTHER PUBLICATIONS

Rosato, et al, "Stabilized detonation for hypersonic propulsion", May 10, 2021, PNAS vol. 118, p. 1-7 (Year: 2021).*

* cited by examiner

*Primary Examiner* — Andrew H Nguyen

(57) ABSTRACT

A rocket engine system having a heating system configured to heat an oxidizer; a combustion section having a flow path from an upstream inlet section through a restricted throat section to a downstream outlet section, the combustion section configured to accelerate the heated oxidizer as an oxidizer stream within the flow path in response to flow dynamics to supersonic speed; and a fuel system configured to introduce a fuel into the flow path to mix supersonically with the heated oxidizer to define a combined fuel and oxidizer stream at a first supersonic speed. The combined fuel and oxidizer stream undergoes a deflagration to denotation transition in the combustion section defined by an oblique shock wave and a normal shock wave that interact to achieve a standing detonation wave generally at an upstream portion of the restricted throat section configured such that combustion exits the downstream outlet section to provide thrust.

10 Claims, 3 Drawing Sheets

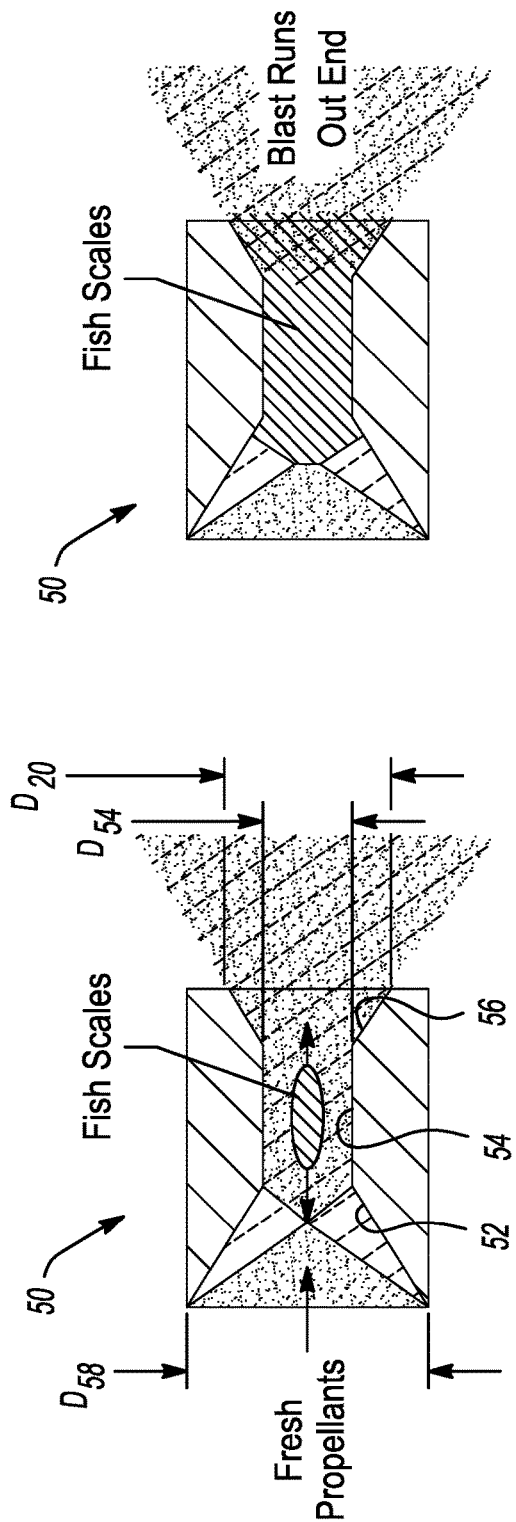
Fig-2a
Fig-2b
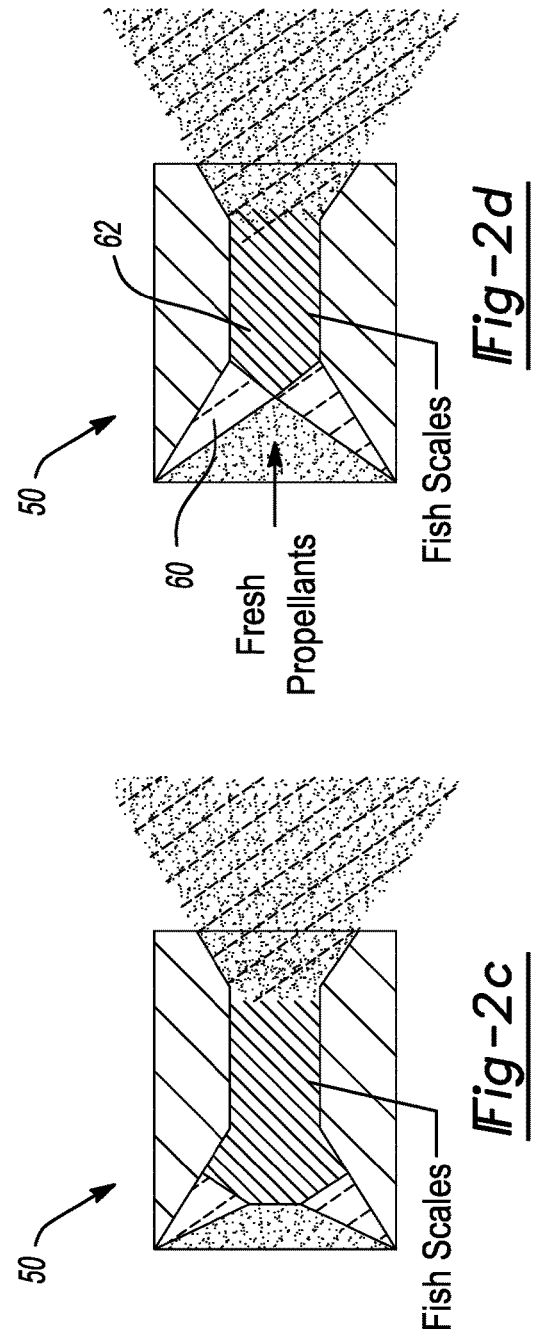
Fig-2c
Fig-2d

OBLIQUE DETONATION ROCKET ENGINE

FIELD

The present disclosure relates to rocket engines and, more particularly, relates to rocket engines configured to generate a sustaining oblique detonation shock wave.

BACKGROUND AND SUMMARY

This section provides background information related to the present disclosure which is not necessarily prior art. This section provides a general summary of the disclosure, and is not a comprehensive disclosure of its full scope or all of its features.

Conventionally, a rotating detonation engine (RDE), for example, is an engine using a form of pressure gain combustion, wherein one or more detonations continuously travel around an annular channel. In detonative combustion, the combustion wave proceeds at supersonic speed and the expanded combustion products provide propulsion. RDEs are theoretically more efficient than conventional deflagrative combustion by as much as 25%, however they may suffer from instability and noise.

Generally, the principle of operation of RDEs is based on a detonation wave traveling around a circular channel (annulus), whereby fuel and oxidizer are injected into the channel, normally through small holes or slits, and detonation is initiated in the fuel/oxidizer mixture by an igniter. After the engine is started, the detonations are self-sustaining to maintain operation of the RDE—that is, one detonation ignites the fuel/oxidizer mixture, which releases the energy necessary to sustain the detonation in subsequent order. The products of detonation combustion expand out of the channel, and are further pushed out of the channel by incoming fuel and oxidizer, resulting in a propelling force.

However, it has been found that although detonation engines of various configurations have been attempted, a major drawback is the complexity of initiating and sustaining rotation. Another major drawback is the large surface area inside and outside the annulus combined with high temperatures from detonation, thus requiring cooling mechanisms which add complexity and are heavy, which in turn has outweighed the performance benefits of detonation. A major drawback of prior rotation detonation engines that have been attempted is that they rely on an aerospike nozzle and cannot utilize a conventional nozzle. Pulsed detonation engines have been attempted to reduce the cooling problem, however these designs have the drawback that, while instantaneous ISP may be higher, the average thrust to weight ratio is low.

According to the principles of the present teachings, a rocket engine system is provided having a heating system configured to heat an oxidizer; a combustion section having a flow path from an upstream inlet section through a restricted throat section to a downstream outlet section, the combustion section configured to accelerate the heated oxidizer as an oxidizer stream within the flow path in response to flow dynamics to supersonic speed; and a fuel system configured to introduce a fuel into the flow path to mix supersonically with the heated oxidizer to define a combined fuel and oxidizer stream at a first supersonic speed. The combined fuel and oxidizer stream undergoes a deflagration to denotation transition in the combustion section defined by an oblique shock wave and a normal shock wave that interact to achieve a standing detonation wave generally at an upstream portion of the restricted throat section configured such that combustion exits the downstream outlet section to provide thrust.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2D are enlarged cross-sectional views of the restricted throat section of the oblique detonation rocket engine showing sequential steps from a start-up or initiation stage to a sustained equilibrium stage;

Corresponding reference numerals indicate corresponding parts throughout the several views of the drawings.

DETAILED DESCRIPTION

Figure 1:
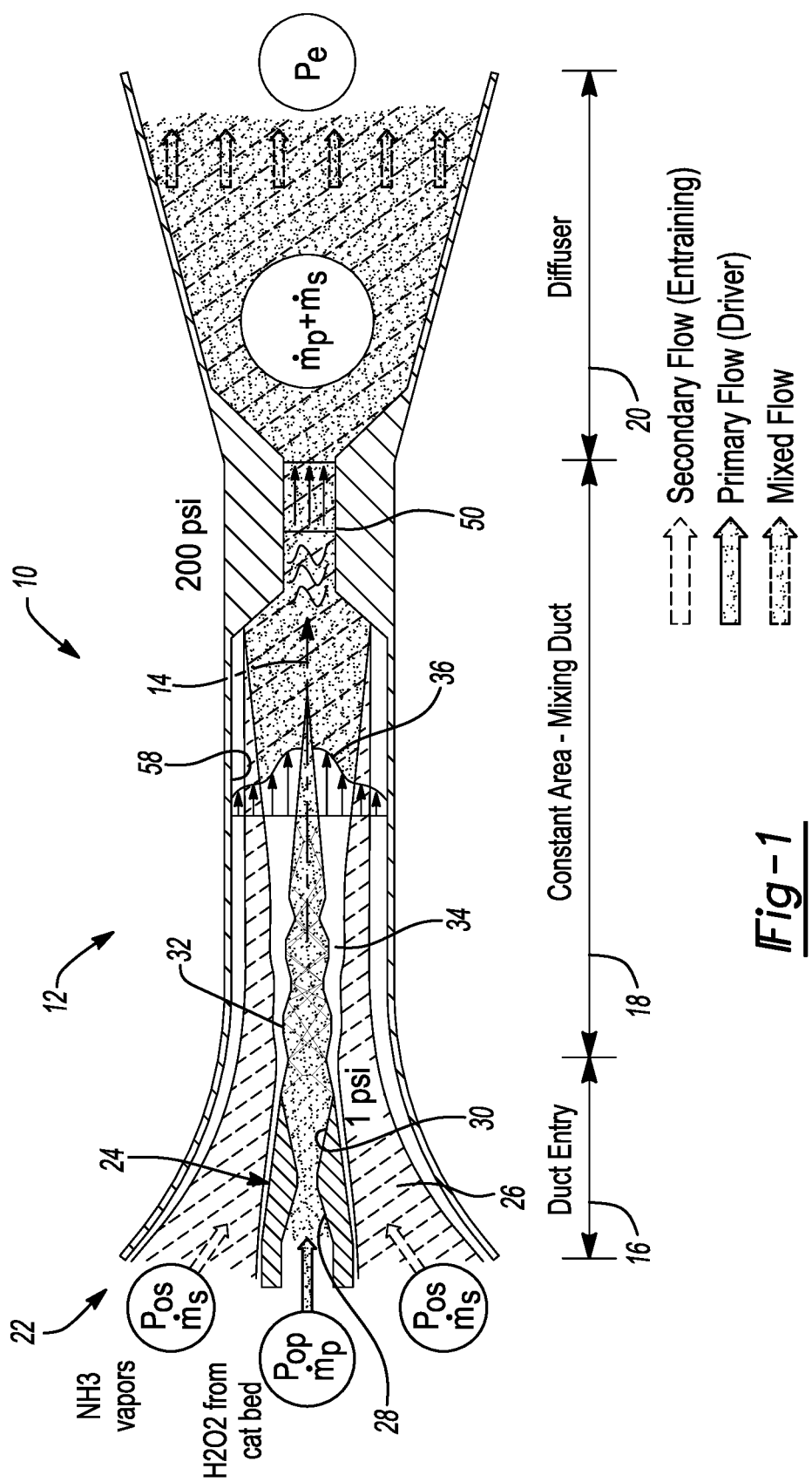
FIG. 1 is a cross-sectional view of an oblique detonation rocket engine using a catalyst bed according to some embodiments of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
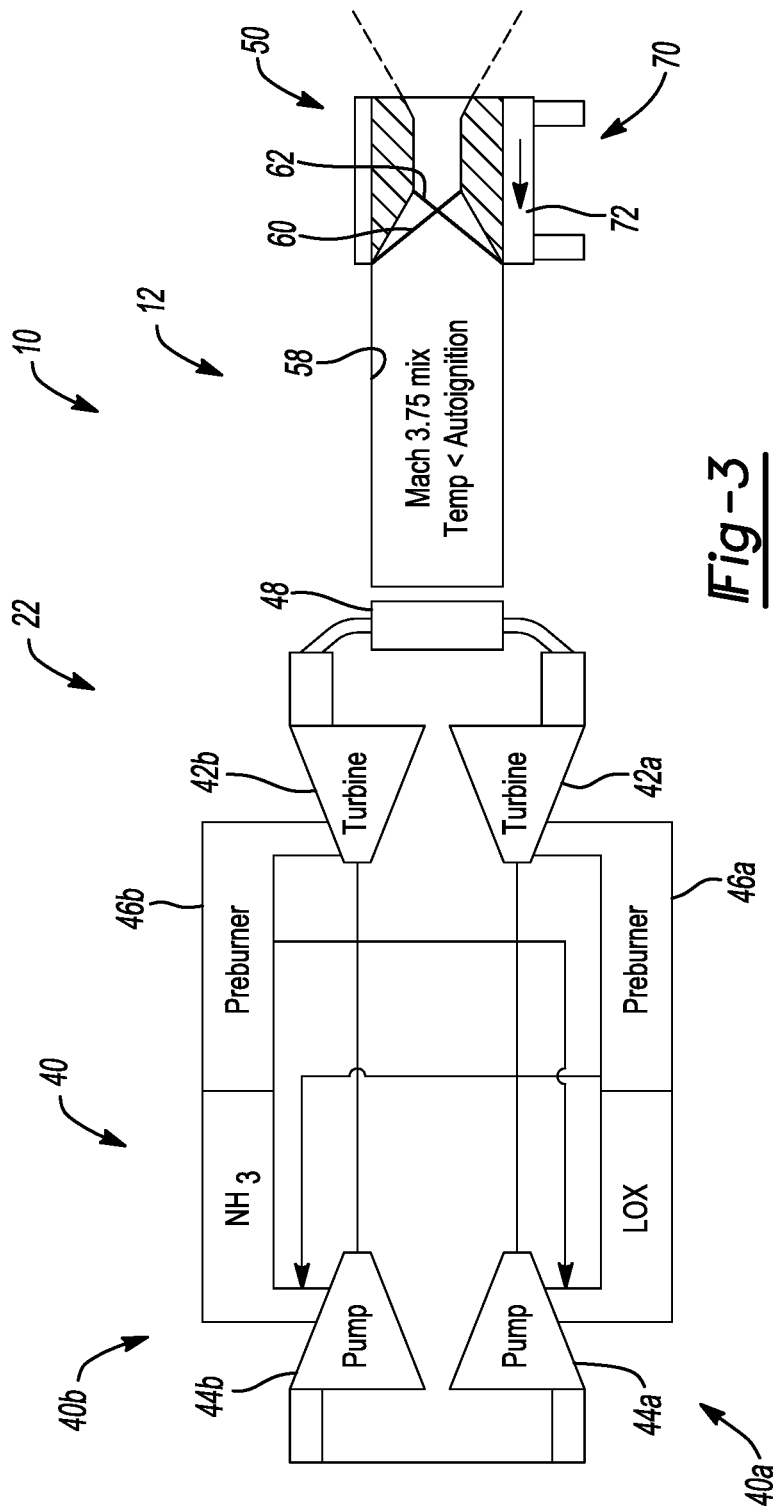
FIG. 3 is a cross-sectional view of an oblique detonation rocket engine using a turbine system according to some embodiments of the present teachings.

According to the principles of the present teachings, a rocket engine 10 that is operative based on the principles of detonation is provided having an advantageous construction and method of operation. In some embodiments as illustrated in FIGS. 1-3, rocket engine 10 can comprise a generally elongated structure having a combustion section 12 defining a flow path 14 from an upstream inlet or entry section 16 through a generally constant cross-sectional area mixing section 18 to a downstream outlet or diffuser section 20. In other embodiments, mixing section 18 may have a cross-sectional area which varies over its length. In some embodiments, rocket engine 10 is configured to receive a propellant in the inlet section 16 and output a high velocity mass flow from outlet section 20 as described herein for the purpose of delivering a propulsive force.

In some embodiments, the propellant can comprise a fuel and an oxidizer. However, it should be understood that alternative propellant combinations and/or configurations are anticipated. In some embodiments, the fuel can comprise a low-vapor pressure fuel, such as but not limited to ammonia ($NH_3$), propane ($C_3H_8$), methane ($CH_4$), or any fuel having a vapor pressure sufficiently low that the fuel boils in response to the low pressure in mixing section 18.

In some embodiments, the oxidizer can comprise any suitable oxidizer, such as but not limited to hydrogen peroxide ($H_2O_2$), liquid oxygen ($LO_2$; $LO_x$), nitric acid ($HNO_3$), nitrogen dioxide ($NO_2$), dinitrogen tetroxide ($N_2O_4$), fluorine ($F_2$), combinations thereof, and the like.

With particular reference to FIGS. 1 and 3, in some embodiments, rocket engine 10 can comprise a propellant introduction system 22 configured to introduce the fuel and the oxidizer, or any other propellant configuration, into inlet section 16. As illustrated in FIG. 1, in some embodiments, propellant introduction system 22 can comprise a central feed nozzle 24 centrally disposed within inlet section 16 of combustion section 12 having an annulus area 26 generally surrounding central feed nozzle 24. In some embodiments, a shape of annulus area 26 is defined by a space or volume between a converging surface of inlet section 16 and the outer surface of central feed nozzle 24. In some embodiments, central feed nozzle 24 comprises a convergent section 28 and an associated divergent section 30 together configured to drive the flow therethrough (e.g., the oxidizer, the oxidizer mixed with precombustion products, the oxidizer mixed with some inert compound, etc.) to a supersonic Mach number. Particularly, in some embodiments as illustrated in FIG. 1, central feed nozzle 24 is configured to receive a preheated oxidizer, such as from a catalyst bed, and drive the oxidizer to about Mach 3.5 to define a primary flow or oxidizer stream 32. In other embodiments, the oxidizer may be driven to other speeds sufficient to educt the fuel and stabilize the detonation wave. The oxidizer stream 32 may result in formation of shock structures 34 along the flow downstream of the divergent section 30 of central feed nozzle 24. The oxidizer stream 32 can act as an eductor—creating a low pressure within the annulus area 26 and/or inner volume of mixing section 18 thereby drawing the fuel within the annulus area 26 into a mixed or partially mixed propellant stream 36. Such mixing of propellants can occur within a mixing length that spans a portion or entirety of inlet section 16 and/or mixing section 18.

With particular reference to FIG. 3, in some embodiments, propellant introduction system 22 is configured to introduce the fuel and the oxidizer, or any other propellant configuration, into injectors 48 using a compressor and/or turbine system 40 comprising one or more separate systems each having a turbine 42 operably coupled to a pump 44 to compress an inlet propellant constituent, such as the fuel and the oxidizer, in separate systems. In such embodiments the fuel and oxidizer comprise those typically used in rocket engines, such as liquid hydrogen and liquid oxygen, or other rocket engine fuels familiar to those skilled in the art. More specifically, as illustrated in FIG. 3, in some embodiments propellant introduction system 22 can comprise a first turbine system 40a having a first turbine 42a receiving the oxidizer at a low pressure (e.g., 60 psi) and low temperature (e.g., −310° F.). The oxidizer, such as liquid oxygen, is pumped via a first pump 44a of first turbine system 40a to an oxidizer preburner system 46a that flows at a low speed (e.g., $M_0$=0.15) to first turbine 42a. First turbine 42a is driven by the output of oxidizer preburner system 46a to turn turbine 42a that is operably coupled to first pump 44a to pump the oxidizer. The oxidizer from first turbine system 40a is then introduced into injector 48. With continued reference to FIG. 3, in some embodiments, propellant introduction system 22 can further comprise a second turbine system 40b having a second turbine 42b receiving the fuel, at a low pressure (e.g., 60 psi) and low temperature (e.g., 0° F.). The fuel, such as liquid hydrogen, is pumped via a second pump 44b of second turbine system 40b to a fuel preburner system 46b that flows in a gaseous phase at a low speed (e.g., $M_0$=0.15) to second turbine 42b. Second turbine 42b is driven by the output of fuel preburner system 46b to turn turbine 42b that is operably coupled to second pump 44b to pump the fuel. The oxidizer from first turbine system 40a and the fuel from the second turbine system 40b are then introduced into injector 48. In some embodiments, a portion of the oxidizer pumped by first pump 44a is delivered to the fuel preburner system 46b of turbine system 40b, or a portion of the fuel pumped by second pump 44b is delivered to the oxidizer preburner system 46a of turbine system 40a, or both. In some embodiments, injector 48 comprises central feed nozzle 24 as described herein. However, in some embodiments, injector 48 can define alternative construction for introducing and mixing or partially mixing the oxidizer and fuel within inlet section 16 to define a combined fuel and oxidizer stream 26 and achieve supersonic flow (e.g., Mach $M_1$=3.5-3.75) of the combined fuel and oxidizer stream 26 within the mixing section 18 at a temperature below the autoignition temperature of the fuel such that the combined fuel and oxidizer stream 26 results in low to no deflagration. In other embodiments, injector 48 may comprise three concentric outlets for a fuel, supercritical coolant, and oxidizer as described in U.S. patent application Ser. No. 17/561,621 filed on Dec. 23, 2021, which is hereby incorporated and made a part of the present disclosure.

As illustrated in FIGS. 1-3, in some embodiments, at least a portion of mixing section 18 and/or a portion of outlet section 20 of combustion section 12 comprises a restricted throat section 50. In some embodiments, restricted throat section 50 can comprise a convergent section 52, a generally cylindrical section 54, and a divergent section 56. In some embodiments, convergent section 52 transitions in a flow direction (along flow path 14) from a diameter generally equal to a diameter $D_{58}$ of a generally constant cross-sectional shape area 58 of mixing section 18 to a diameter $D_{54}$ equal to generally cylindrical section 54. In some embodiments, the shape of the transition of convergent section 52 can be generally uniform, varying, exponential, parabolic, and/or non-uniform to achieve a desired oblique shock wave and/or a desired normal shock wave, as discussed herein. Likewise, in some embodiments, divergent section 56 transitions in a flow direction from a diameter generally equal to the diameter $D_{54}$ of generally cylindrical section 54 to a diameter $D_{20}$ of outlet section 20. It should be understood that in some embodiments divergent section 56 may transition directly to ambient conditions and, thus, divergent section 56 of restricted throat section 50 may fully comprise and define outlet section 20. In some embodiments, the shape of the transition of divergent section 56 can be generally uniform, varying, exponential, parabolic, and/or non-uniform to achieve a desired propulsion wave, shape, and/or thrust profile. Moreover, in some embodiments, the shape of the divergent section 56 can define a LaVal nozzle. In some embodiments, the transition of convergent section 52, or of the divergent section 56, or of both can be shaped such that more than one desirable stable flow configuration can be achieved, that the modes may be moved between actively or passively in response to a signal or condition, and that each stable mode is associated with one or more dissimilar, similar, or identical operating points of flow or delivered performance. In some embodiments, the shape of the transition of convergent section 52, or of the divergent section 56, or of both can be altered during or between operations to control, change, stabilize, etc. the flow configuration actively or passively in response to a signal or condition and in coordination with or independently from a change in state of another component or system. In some embodiments, the throat section 50 can be approximately one quarter the cross-sectional area of the mixing section 18.

With continued reference to FIGS. 1-3, the combined shape and size of mixing section 18, restricted throat section 50, and outlet section 20 can contribute to the formation and sustained presence of a desired oblique shock wave 60 and/or a desired normal shock wave 62. It has been found that formation and sustained presence of oblique shock wave 60 can serve to promote oblique detonation of the propellants to produce higher exit velocity out of outlet section 20. A higher exit velocity is directly correlated to engine efficiency of thrust and mass flow (e.g., specific impulse or ISP).

With particular reference to FIGS. 2A-2D, four steps are illustrated showing the initial deflagration-detonation transition (DDT) through to sustained equilibrium. As illustrated in FIG. 2A, DDT is shown occurring within generally cylindrical section 54 as a series of combustion (through detonation) events evidenced as "fish scales" forming therein. As deflagration-detonation begins to occur, a blast effect is produced that pushes outwardly (e.g., both upstream and downstream) at about Mach $M_2$=3.1-3.2, in some embodiments. However, as discussed herein, propellant introduction system 22 is configured to drive the combined fuel and oxidizer stream 26 to about Mach 3.5 and at least greater than the speed of propagation of the blast effect. Stated differently, the rate of flow of the combined fuel and oxidizer stream 26 is greater than the rate of the blast effect, thereby generally preventing and/or halting upstream flow of the blast effect. The blast effect, as illustrated in FIG. 2B, may move upstream partially, but will ultimately be driven downstream by the combined fuel and oxidizer stream 26 until it reaches an equilibrium state. Oblique shock wave 60 will form generally radially from cylindrical section 54 and along convergent section 52. In some embodiments, oblique shock wave 60 will generally form a pattern tapered in thickness as it radiates outwardly. In some embodiments, as illustrated in FIG. 2B, the blast may form fish scales or other protrusions in the normal blast wave profile. However, combustion rate decreases as temperature decreases (see FIG. 2C) until final equilibrium is achieved wherein oblique shock wave 60 and normal wave 62 form at restricted throat section 50; particularly, normal wave 62 generally extends from an upstream end of cylindrical section 54 downstream and out of divergent section 56. Moreover, oblique shock wave 60 generally extends from an upstream end of cylindrical section 54 further upstream along convergent section 52 until it reaches equilibrium based on the rate and/or pressure of the downstream flow of the combined fuel and oxidizer stream 26. In the event rate and/or pressure of the downstream flow of the combined fuel and oxidizer stream 26 ceases, detonation also ceases without damage to rocket engine 10.

By way of non-limiting example, it has been found that rocket engine 10 can achieve operating parameters such that flow from propellant introduction system 22 or injector 48 can define an initial Mach speed $M_0$=0.15 and pressure of about $P_0$=1 psi. As the propellants are introduced into inlet section 16 and/or mixing section 18, the combined fuel and oxidizer stream 26 is accelerated to a flow speed of $M_1$=3.5-3.75; however, it should be understood that the combined fuel and oxidizer stream 26 can be accelerated to any speed greater than the detonation speed of the fuel and the oxidizer (based on nominal operating temperature). As equilibrium is reached, oblique shock wave 60 can define a region between the high-Mach upstream and lower-Mach downstream, both of which are below the autoignition temperature of the fuel; however, it should be understood that the oblique shock wave 60 can define a boundary between two regions with different velocities. For example, in some configurations, for ammonia and peroxide, the velocity in the region before the oblique shock might be Mach 3.5 and the velocity in the region 52 after the oblique shock might be Mach 2.3 at 70 psi and 775° F. Moreover, as equilibrium is reached, normal shock wave 62 can define a flow speed of $M_{3a}=0.22$, an Oxidizer Fuel ratio by mass (OF) of 1.4, and a temperature $T_3=1300°$ F., which is above the autoignition temperature of the fuel (i.e., 1200° F.). It should be understood that the examples contained herein are for illustration purposes and should not be regarded as limiting unless specifically claimed.

Figure 4:
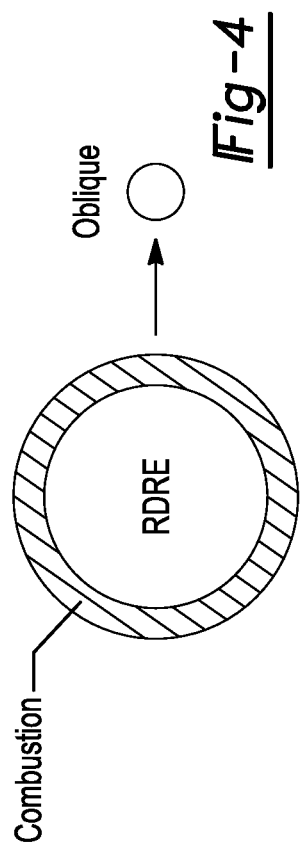
FIG. 4 illustrates a cross-sectional view of a portion of the oblique detonation rocket engine and a portion of a rotating detonation rocket engine.

In some embodiments, a regeneration system 70 is provided for cooling restricted throat section 50 and/or provide initial heat to the fuel. To this end, as illustrated in FIG. 3, a conduit or channel 72 can be provided thermally adjacent to restricted throat section 50 to receive heat from restricted throat section 50 and heat fuel within channel 72. Fuel can be driven via a pump and distributed to the fuel inlet. It should be recognized, as illustrated in FIG. 4, that combustion (through detonation) of the present rocket engine 10 is generally contained within the cylindrical section 54 of the restricted throat section 50. When one compares the size and surface area of the area effected by heat produced in connection with the present teachings to heat produced in connection with a rotating detonation rocket engine, it has been found that the present invention requires twelve (12) times less surface area that needs to be cooled.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rocket engine system comprising:
    a heating system configured to heat an oxidizer;
    a combustion section having a flow path from an upstream inlet section through a restricted throat section to a downstream outlet section, the combustion section configured to accelerate the heated oxidizer as an oxidizer stream within the flow path in response to flow dynamics to supersonic speed;
    a fuel system configured to introduce a fuel into the flow path to mix supersonically with the heated oxidizer to define a combined fuel and oxidizer stream at a first supersonic speed;
    a propellant introduction system configured to introduce the fuel and the oxidizer, the propellant introduction system comprises a central feed nozzle centrally disposed within the inlet section of the combustion section having an annulus area generally surrounding the central feed nozzle;
    wherein the combined fuel and oxidizer stream undergoes a deflagration to detonation transition in the combustion section defined by an oblique shock wave and a normal shock wave;
    wherein the combustion section is configured such that the oblique shock wave and the normal shock wave interact to achieve a standing detonation wave generally at an upstream portion of the restricted throat section, the standing detonation wave configured to prevent combustion from moving upstream, wherein combustion exits the downstream outlet section to provide thrust; and
    wherein the central feed nozzle comprises a convergent section and a divergent section together configured to drive the oxidizer to the supersonic speed.

2. The rocket engine system of claim 1 wherein the fuel is selected from the group consisting of ammonia, propane, and methane.

3. The rocket engine system of claim 1 wherein the fuel has a vapor pressure low enough to boil in the oxidizer stream.

4. The rocket engine system of claim 1 wherein the oxidizer is chosen from the group consisting of hydrogen peroxide ($H_2O_2$), liquid oxygen ($LO_2$; $LO_x$), nitric acid ($HNO_3$), nitrogen dioxide ($NO_2$), dinitrogen tetroxide ($N_2O_4$), fluorine ($F_2$), and combinations thereof.

5. The rocket engine system of claim 1 wherein the heating system comprises a catalyst bed.

6. The rocket engine system of claim 1, wherein the propellant introduction system further comprises a first turbine system having a first turbine receiving the oxidizer via a first pump, the oxidizer from the first turbine system being introduced into the combustion section, the propellant introduction system further comprises a second turbine system having a second turbine receiving the fuel via a second pump, the fuel from the second turbine system being introduced into the combustion section via the fuel system.

7. The rocket engine system of claim 1 wherein the throat section comprises approximately one quarter the cross-sectional area of a mixing section.

8. The rocket engine system of claim 1 wherein the deflagration to detonation transition is initiated by a shock tube.

9. The rocket engine system of claim 1 wherein the throat section is regeneratively cooled.

10. The rocket engine system of claim 1 wherein the combustion section is configured to accelerate the oxidizer stream within the flow path to a speed of at least Mach 3.

* * * * *